United States Patent [19]
Thoreson

[11] Patent Number: 5,887,396
[45] Date of Patent: Mar. 30, 1999

[54] INTUMESCABLE FIRE STOP DEVICE HAVING QUICK FASTENERS

[75] Inventor: Thomas L. Thoreson, White Bear Lake, Minn.

[73] Assignee: Minnesota Mining and Manufacturing Company, St. Paul, Minn.

[21] Appl. No.: 78,075

[22] Filed: May 13, 1998

[51] Int. Cl.⁶ .............................. F16L 5/04; F16K 17/38; E04C 2/52

[52] U.S. Cl. .................. 52/232; 52/220.8; 52/1; 52/712; 52/741.3; 52/745.21

[58] Field of Search .................... 52/232, 220.8, 52/219, 1, 712, 741.3, 745.21

[56] References Cited

U.S. PATENT DOCUMENTS

| | | | |
|---|---|---|---|
| 3,052,065 | 9/1962 | Rettman | 52/220.8 |
| 5,103,609 | 4/1992 | Thoreson et al. | 52/232 |
| 5,452,551 | 9/1995 | Charland et al. | 52/232 |

FOREIGN PATENT DOCUMENTS

| | | | |
|---|---|---|---|
| 3341728 | 6/1985 | Germany | 52/220.8 |

*Primary Examiner*—Robert Canfield
*Attorney, Agent, or Firm*—Michaele A. Hakamaki

[57] ABSTRACT

An intumescable fire stop device and method of installing the same including a collar and a fastening device. The collar includes intumescable material supported by a jacket. The fastening device includes an axial shaft portion, a radial shank portion and a means to attach the fastening device to the collar. The radial shank portion is placed through an opening in a wall or other rigid surface through which a pipe or other member extends and between the wall and the pipe. The radial shank portion is then extended on the far side of the wall to engage the far side of the wall and firmly secure the collar to the near side of the wall.

17 Claims, 6 Drawing Sheets

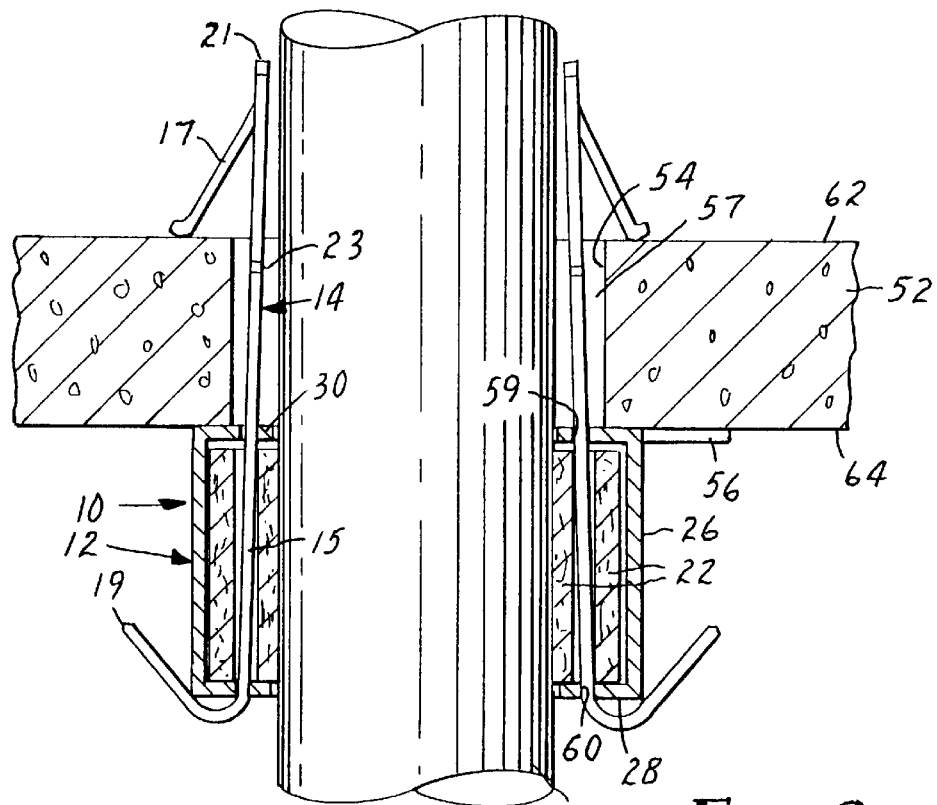
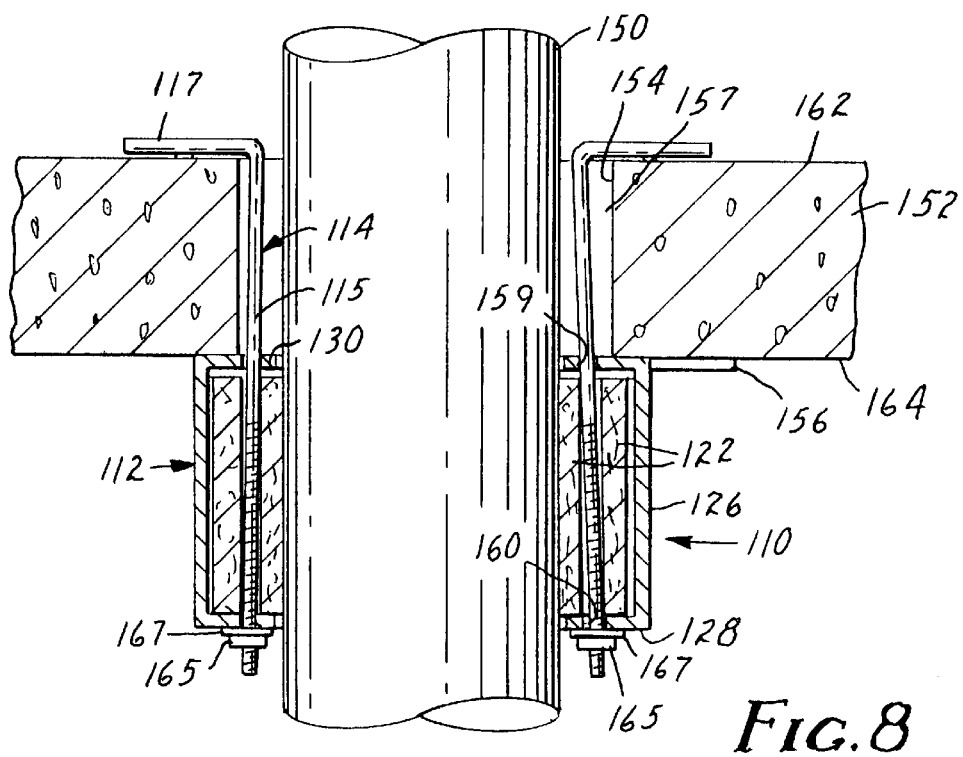

ized fire stop collar for rapid attachment to a wall, floor,
INTUMESCABLE FIRE STOP DEVICE HAVING QUICK FASTENERS

BACKGROUND

1. Technical Field

The present invention relates to fire stop devices. In particular, the present invention is directed to an intumescable fire stop collar for rapid attachment to a wall, floor, ceiling, or other rigid surface where a pipe or other device passes through the wall.

2. Background of the Invention

When fire starts in one section or room of a building, structural members of the building such as walls, floors and ceilings generally act to retard spread of the fire to other sections or rooms. This is particularly true where the wall or floors are constructed of fire resistant materials, such as concrete, to create a fire barrier. Typically, however, ducts or pipes run between rooms in the building to distribute services, such as water and electricity, from a central source to the various sections or rooms. These ducts or pipes must pass through openings in the floors, ceilings and walls of the building. Further, such ducting or piping is often formed of plastic or may be housed in an insulating jacket. As such, the heat from a fire in a room of the building can either melt the plastic or burn the insulating jacket from the exterior of a pipe leaving openings large enough for fire to spread through. If this occurs, both the room adjacent to a room in which a fire is burning and the interior of a wall separating the two rooms can be exposed to the fire through the opening created in the wall. This may allow the fire to pass into the interior of the wall and/or the adjacent room more quickly, or even through a fire barrier.

To help reduce the speed at which fire can spread between rooms due to the openings for pipes in the structural members of the building, various fire stop devices have been developed. Essentially, these devices comprise a collar having intumescable material sheathed in a semi-rigid jacket. Intumescable material is material which will swell, char and harden when exposed to heat and flame.

The collar including the intumescable material can be fastened around a pipe or other conduit at the opening in a wall, floor or ceiling through which the pipe passes. If the pipe is plastic or insulated, heat from a fire will cause the plastic to melt or the insulation to burn off, respectively. At the same time, the heat from the fire will also cause the intumescable material in the collar to expand, closing off the opening to an adjacent room or the interior of the wall left by the melted plastic pipe or burned insulation. In this way, the expanded intumescable material in the opening creates an insulating, fire retarding barrier that slows the spread of fires.

One such fire stop collar is described in U.S. Pat. No. 5,103,609, entitled "Intumescable Fire Stop Device", and issued Apr. 14, 1992 to Thoreson et al. ("Thoreson") Thoreson discloses an intumescable fire stop device which includes a collar that supports an intumescable material about a section of a pipe which passes through an opening in a structural surface such as a wall. The collar is fastened about the pipe by spaced fingers on one end of the collar which are placed through spaced openings on an opposite end of the collar. The collar also includes a plurality of mounting clips for connecting the collar to a wall or other structural member. Each mounting clip is secured to a side wall of the collar and provides a mounting plate. Each mounting plate has an aperture through which a screw or bolt can be positioned to secure the collar to the surface of the wall or other structural member after a hole has been drilled or otherwise formed in the wall.

A number of steps are required to install this device. The collar must first be placed against the wall and the locations for holes for the screws or bolts must be marked. The holes must then be drilled. A screw or bolt and a washer is then inserted through the aperture of each mounting plate and secured into the wall. With a concrete wall, for example, the collars are attached by way of masonry anchors that require pre-drilling holes with a hammer drill, and screwing into the anchors. For drywall applications, anchors or toggle bolts are required that add to the steps and time of installation. Thus, the installation process is a time consuming effort and may require the cooperation of two installers, if, for example, a bolt is to pass completely through the wall and be attached at the opposite surface of the wall.

SUMMARY OF THE INVENTION

The present invention includes an intumescable fire stop device which is easy to manufacture, relatively simple and quick to install, and operates effectively to retard the spread of fire in a building. In particular, the present invention includes an intumescable fire stop device having a collar and at least one fastening device. The collar is for placement against the first face of a structural member or other rigid surface and around an outer surface of a pipe or other element passing through the rigid surface. The collar includes a guide and intumescable material both supported by a semi-rigid jacket. The fastening device includes an elongated axial shaft portion and a radial shank portion. The elongated axial shaft portion is for passing through the opening in the structural member and is adjustably attached to the collar along the guide. The radial shank is supported by the axial shaft and is movable between a first radial inward position and a second radial outward position. In the first radial inward position, the radial shank can be placed into the opening in the structural member. In the second radial outward position, the shank can engage the structural member.

A method for securing the intumescable fire stop device to a rigid surface of a structural member, such as a wall, having an element, such as a pipe, passing therethrough includes providing an intumescable fire stop device including a collar and at least one fastening device. The collar includes a semi-rigid jacket having at least one guide and for supporting intumescable material. The fastening device includes an axial shaft portion connectable to the collar and a radial shank portion at one end of the axial shaft portion which can protrude from the axial shaft portion. The axial shaft portion of the fastening device is inserted into the guide in the collar. The radial shank portion of the fastening device is collapsed into a first radial inward position and inserted into the opening and between the element and the structural member. The radial shank portion is then extended to a second radial outward position to engage the structural member such that the fastening device resists passing back through the opening. The position of the axial shaft portion is adjusted in the guide such that the collar is firmly secured against the first face of the rigid surface.

BRIEF DESCRIPTION OF THE DRAWINGS

FIG. 3 is a cross-sectional view of the intumescable fire stop device of FIG. 1 secured around a pipe and located adjacent to a wall with a plurality of fastening devices secured in place.

FIG. 8 is a cross-sectional view of a fire stop device including a collar similar to that of FIG. 1, but having an alternate construction for fastening devices in position to secure the fire stop device about a pipe and against a wall.

DETAILED DESCRIPTION

Figure 1:
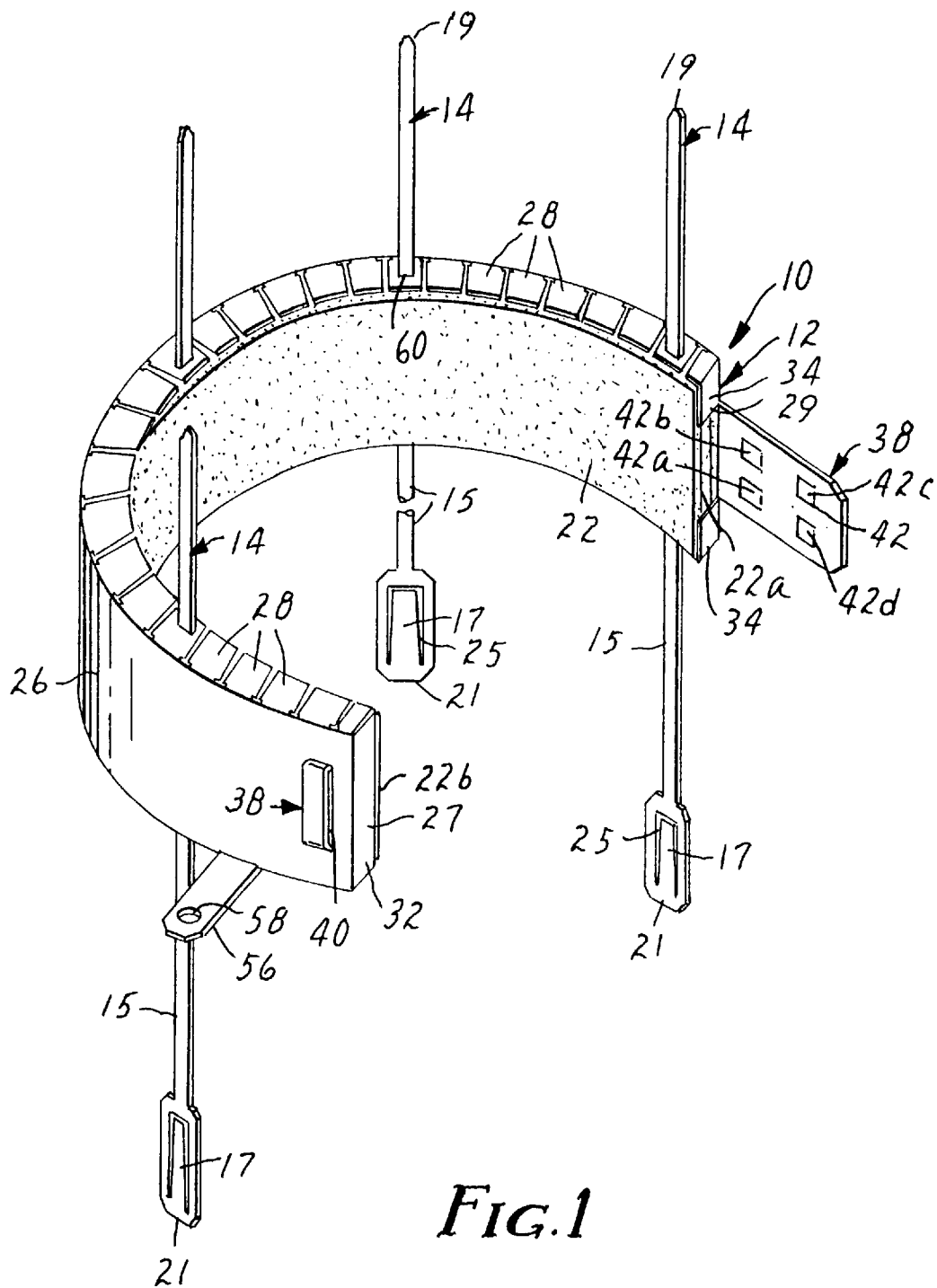
FIG. 1 is a perspective view of an intumescable fire stop device including a collar and a plurality of fastening devices in accordance with the present invention.

FIG. 1 is a perspective view of a fire stop device 10 including a collar 12 and a plurality of fastening devices 14. In the embodiment shown, collar 12 includes a layer 22 of flexible intumescable material preferably formed into a substantially cylindrical shell and supported by a jacket 26, the details of which are discussed below. Preferably, the layer 22 comprises plural sub-layers, such as stacked on top of one another, but may be only one layer. End 22a of layer 22 remains unattached to opposing end 22b of layer 22 to allow layer 22 to be wrapped around a conduit, pipe or other element (not shown in FIG. 1). It is also contemplated that intumescable material be included in collar 12 in other than a single layer, or other form, such as a plurality of relatively smaller strips aligned axially along the jacket 26. The layer 22 of intumescable material can be cut from sheets of intumescable material manufactured by the Minnesota Mining and Manufacturing Corporation of St. Paul, Minn. under the name Interame® Ultra GS fire barrier material. Other intumescable material suitable for use with the present invention is disclosed in U.S. Pat. No. 5,103,609, for "Intumescable Fire Stop Device", issued Apr. 14, 1992 to Thoreson et al.; U.S. patent application Ser. No. 09/016,879 for "Low Density Fire Barrier Material and Method of Making", filed Jan. 30, 1998; and U.S. Patent application Ser. No. 09/016,876, for "Fire Barrier Material", filed Jan. 30, 1998. Each of these references is hereby incorporated by reference in its entirety.

Figure 2:
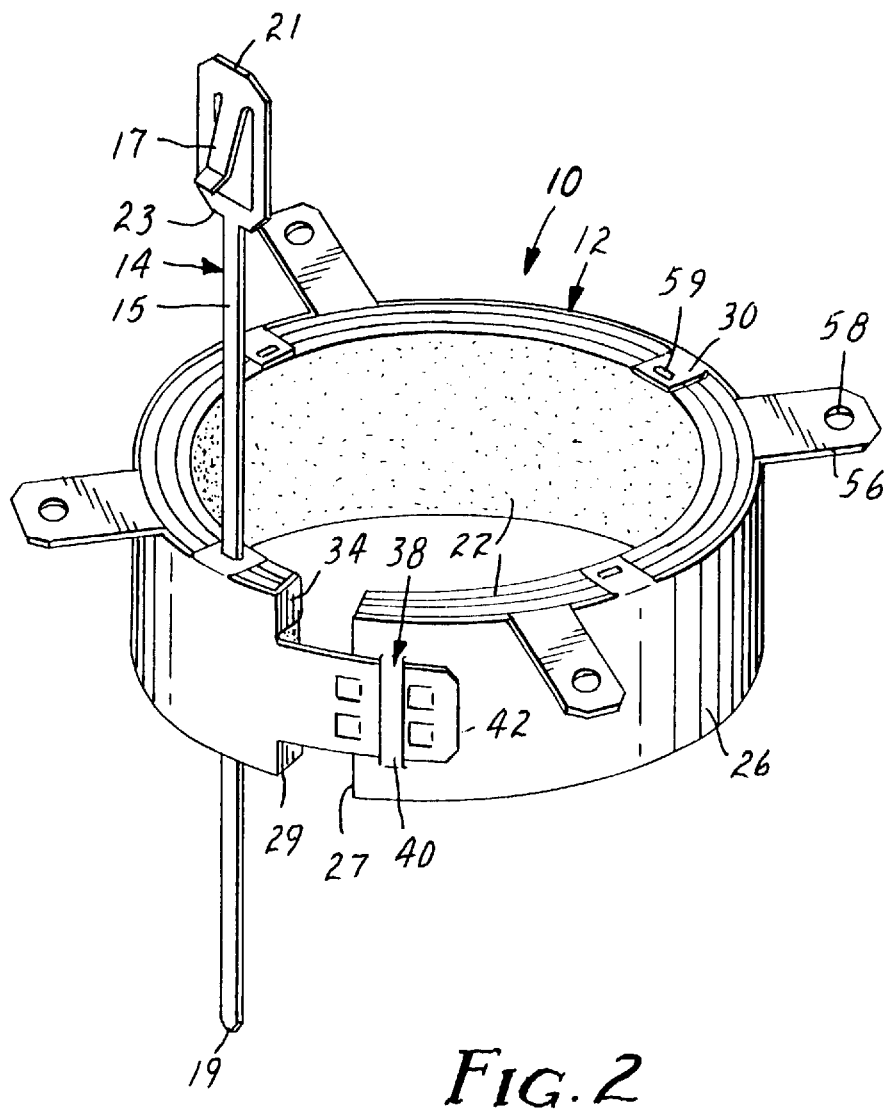
FIG. 2 is a perspective view of the intumescable fire stop device of FIG. 1 shown from the opposite side.
Figure 4:
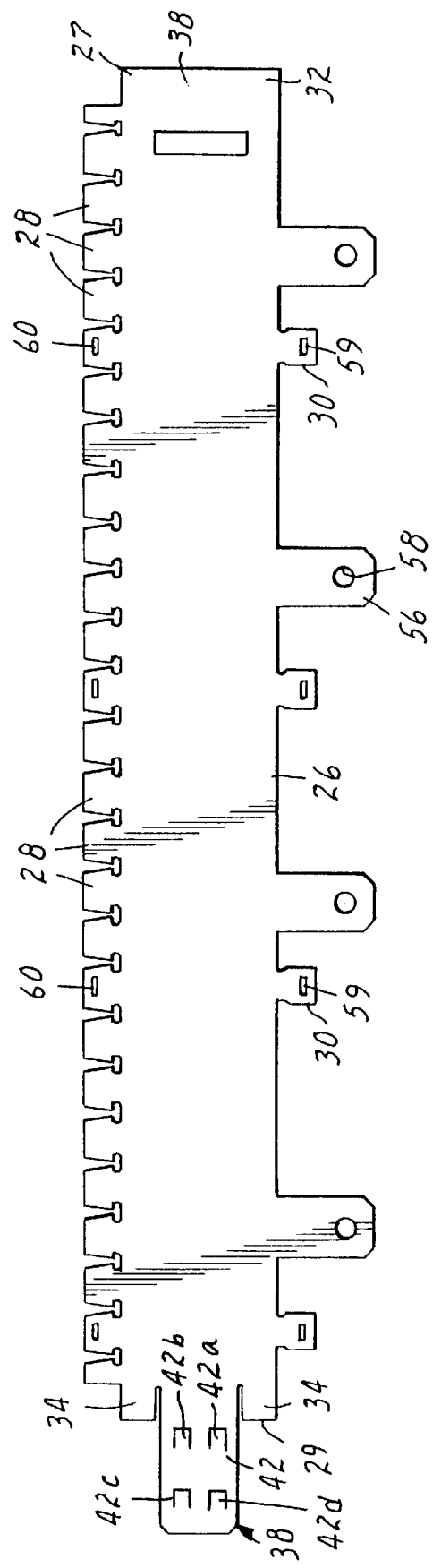
FIG. 4 is a plan view of a jacket of the fire stop device of FIG. 1 before being formed into a substantially cylindrical shell.

Jacket 26 can be formed from any suitable, semi-rigid (that is, somewhat flexible), heat conducting material, and is preferably formed from steel. As shown in FIG. 4, which is a plan view of jacket 26, jacket 26 can be formed from a substantially rectangular sheet of material. As with layer 22, and as shown in FIG. 1, jacket 26 is formed into a substantially cylindrical shell having opposing ends 27 and 29, so that it may be wrapped around a conduit, pipe or similar element. To support layer 22, jacket 26 can be provided with a plurality of axially upper tabs 28 and lower tabs 30. Also, jacket 26 can include end tab 32 at end 27 and end tabs 34 at end 29 to further support layer 22. In the embodiment shown in FIGS. 1–3, upper tabs 28, lower tabs 30, and end tabs 32 and 34 are bent at an angle of approximately 90 degrees to the remainder of jacket 26 so that they protrude radially inward from the remainder of jacket 26 to effectively support layer 22 at the radial interior of jacket 26. Layer 22 may also be secured in place by other mechanical fasteners, or may also or instead be adhered to the jacket 26.

Jacket 26 also includes a connecting device 38 for securing end 27 adjacent to end 29 after jacket 26 has been placed around a conduit, pipe, or other element. In the embodiment shown, connecting device 38 includes a slot 40 at end 27 and finger 42 adjacent to end 29. Slot 40 is sized to accommodate finger 42 so that finger 42 can be inserted through slot 40 when jacket 26 is placed around a conduit. As shown, finger 42 also preferably includes detent tabs 42a, 42b, 42c and 42d for securing finger 42 into slot 40. As shown in FIGS. 1 and 3, detent tabs 42a–42d can each be formed by a generally "U"-shaped cut in finger 42. Detent tabs 42a–42d can be bent radially outward to lie slightly radially above the remainder of finger 42.

Also, detent tabs 42a and 42b are axially aligned with each other and detent tabs 42c and 42d are axially aligned with each other. Therefore, because, as noted above, jacket 42 is formed from flexible material, when finger 42 is inserted within slot 40, detent tabs 42c and 42d can elastically deflect radially inward as they pass through slot 40. Once detent tabs 42c and 42d have passed through slot 40, they can return to their radially raised position to prevent finger 42 from passing out of slot 40. In this way, end 27 and end 29 are secured in a position adjacent to each other. This allows collar 12 to be secured to a pipe around which it has been placed. To decrease the radius of collar 12 to accommodate a smaller diameter pipe, detent tabs 42a and 42b can be inserted through slot 40.

It is understood that any suitable connecting device can be used to secure end 27 adjacent to end 29. For example, finger 42 need not include detent tabs 42a–42d. Rather, finger 42 could simply be placed through slot 40 and bent back around collar 12 when collar 12 is at a radius such that it will closely fit a pipe around which it has been placed. In this way, the radius of collar 12 can be continuously variable to accommodate different diameter pipes. It is also contemplated that jacket 26 include more than one slot such as slot 40 and more than one cooperating finger such as finger 42. Any other suitable connecting device is also within the scope of the present invention.

FIG. 3 illustrates a cross-sectional view of fire stop device 10 positioned against a firm surface such as wall 52 where a pipe 50 passes through an opening 54 in wall 52. In order to operate correctly in the event of a fire, fire stop device 10 should remain substantially outside opening 54. To facilitate this, jacket 26 can include a plurality of feet 56 which extend radially outward from a wall-side edge of jacket 26. Feet 56 may each include a hole 58 extending therethrough so that, if desired, collar 12 can be attached to wall 52 by threaded connectors such as a screw or bolt passing through hole 58 and into the wall 52 in addition to the manner of attachment in accordance with the present invention. When jacket 26 is secured against wall 52, as discussed below, feet 56 help prevent jacket 26 from passing into opening 54 in wall 52. However, jacket 26 need not include feet 56 where the radial thickness of collar 12 can prevent it from passing into an opening in a wall such as opening 54 in wall 52.

As noted above, jacket 26 preferably includes upper tabs 28 and lower tabs 30 which protrude radially inward from the remainder of jacket 26 to support layer 22 of intumescable material. In the embodiment shown in FIGS. 1–4, a slot 59 is provided through the thickness of each lower tab 30. Further, each of the upper tabs 28 which is axially aligned with a lower tab 30 also includes a slot 60 passing through the thickness of the upper tab 28. In this way, each slot 59 is axially aligned on jacket 26 with a slot 60. Further, slots 59 and 60 are sized to allow a portion of a fastening device 14, described in detail below, to pass therethrough so that a plurality of fastening devices 14 can be attached to collar 12. It is also contemplated that tabs containing slots such as slots 59 and 60 can protrude radially outward from jacket 26 and be axially located at any position along jacket 26.

Figure 5:
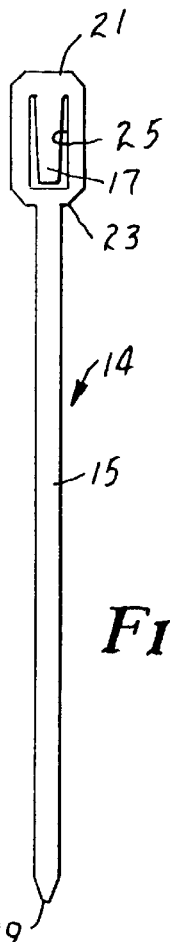
FIG. 5 is a front view of the fastening device shown in FIG. 1.

FIG. 5 is a front view of fastening device 14 of fire stop device 10, including an elongated axial shaft portion 15 and a radial shank portion 17 supported by elongated axial shaft portion 15. In the embodiment shown in FIG. 5, fastening device 14 is preferably formed from a flexible spring material such as stainless steel, and the elongated axial shaft portion 15 is formed unitarily with the radial shank portion 17. The elongated axial shaft portion 15 narrows on a first end 19 thereof and widens into a substantially rectangular portion 21 at a second end 23 thereof. In the embodiment shown in FIG. 5, wide portion 21 includes a substantially "U" or "V" shaped cut 25 such that radial shank portion 17 is formed by the portion of the material interior to cut 25.

Figure 6:
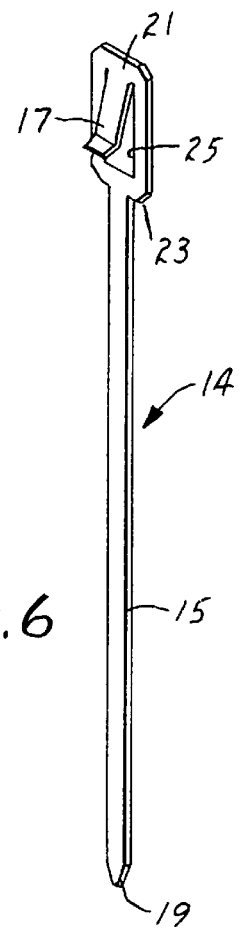
FIG. 6 is a perspective view of the fastening device shown in FIG. 1.

Preferably the material from which radial shank portion 17 of fastening device 14 is formed will plastically deform if sufficiently bent. However, preferably, if shank 17 is bent a relatively short distance, it will only elastically deform. Accordingly, as shown in FIGS. 5 and 6, radial shank portion 17 can be plastically deformed along a portion thereof which connects radial shank portion 17 to the remainder of portion 21 so that radial shank portion 17 extends out of a plane of the remainder of portion 21. That is, shank 17 is bent to a radially outward position. As discussed more fully below, other configurations for a fastening device such as fastening device 14 are also within the scope of the present invention.

To secure fire stop device 10 in a position around a pipe 50 and against a rigid surface such as wall 52, as shown in FIG. 3, a plurality of fastening devices 14 are adjustably inserted through collar 12. Each axial shaft portion 15 of each fastening device 14 can be guided by slot 59 and slot 60 which are axially aligned on jacket 26. As described above, layer 22 of intumescable material is supported in the region of collar 12 axially between tabs 28 and 30 in which slots 60 and 59, respectively, are located. Thus, a passage is provided between the slots 59 and 60 and extending through the layer 22, so as to define a path or guide through collar 12 for slidable movement of the axial shaft portion 15 of each fastener 14. Where layer 22 comprises a single layer, an axial passage (not shown) is provided through the layer 22. Where layer 22 comprises plural sub-layers, the slots 59 and 60 can be radially positioned so that the axial shaft portion 15 can pass easily between the sub-layers. This is especially true where a substantially flat axial shaft portion 15 is provided such as shown in FIGS. 5 and 6. Otherwise, layer 22 can be located in this region loosely enough such that axial shafts 15 of fastening devices 14 can pass radially above or below layer 22 in this region. FIG. 3 shows axial shafts 15 of fastening devices 14 passing radially between sub-layers of layer 22.

The plurality of fastening devices 14 can be extended through a portion 57 of opening 54 in wall 52 between pipe 50 and the edge of opening 54. As noted above, radial shank portions 17 of fastening devices 14 are elastically deformable to a radially inward position. Thus, because the portion 57 of opening 54 between pipe 50 and the edge of opening 54 will typically be relatively narrow, radial shank portion 17 can be deflected radially toward portion 21 by the edge of wall 52 as it is being passed through opening 54. When radial shank portion 17 has passed entirely through opening 54, the elasticity of radial shank portion 17 will cause it to return to its un-deflected, radially outward position so that it will extend radially beyond opening 54 on a surface 62 of wall 52 opposite surface 64 of wall 52 against which collar 12 is to be positioned. Even if radial shank portion 17 were to slightly plastically deform back towards portion 21 as fastening device 14 is pushed through opening 54, radial shank portion 17 can be plastically deformed to extend radially further beyond opening 54 on surface 62 by engaging radial shank portion 17 on surface 62 and pulling axial shaft portion 15 of fastening device 14 axially away from surface 62, that is, in a direction which would tend to pull portion 21 including radial shank portion 17 back toward wall surface 64.

It is also within the scope of the present invention to insert the radial shank portion 17 only partially into opening 54. In this way, a free end of radial shank portion 17 can engage with an interior edge of wall 52 between surface 62 and surface 64 thereof to prevent fastening device 14 from disengaging with wall 52.

By inserting a plurality of fastening devices 14 through guides of collar 12 and through opening 54, collar 12 can be positioned firmly against surface 64 of wall 52 and connecting device 38 can be engaged to fit collar 12 snugly around pipe 50. Then, as shown in FIG. 3, each axial shaft portion 15 can be bent back around collar 12. Because radial shank portion 17 radially extends beyond surface 62 of wall 52, or engages with an interior edge of wall 52 between surface 62 and 64, fastening device 14 cannot pass back through opening 54. Further, feet 56 (or the radial thickness of collar 12) will prevent collar 12 from passing into opening 54. Thus, by firmly placing collar 12 against surface 64 of wall 52 and bending axial shafts 15 around collar 12, collar 12 can be firmly secured against surface 64 of wall 52. It is also contemplated to place fastening devices 14 through opening 54 prior to attaching collar 12 to axial shafts 15. Further, connecting device 38 can be engaged either before or after fastening devices 14 have been bent about collar 12.

It is to be understood that each fastening device 14 can be secured in a guide of collar 12 by bending each axial shaft portion 15 at any point along the axial shaft portion 15. Thus, use of fire stop device 10 is advantageously not limited to use on a wall of one particular thickness. If a fire stop device 10 is to be attached to a relatively thicker wall, axial shafts 15 can be bent back at a point closer to ends 19 thereof. If fire stop device 10 is to be attached to a relatively thinner wall, axial shafts 15 can be bent back at a point further from ends 19 thereof.

Further, using fastening devices 14 to secure fire stop device 10 against a wall or other firm surface, such as a ceiling or floor, is advantageously relatively simple and can be installed by a single person without the need to access the opposite side of the wall. Also, no drilling of holes adjacent to an opening through which a pipe extends is necessary. Additionally, in the case where the surface of a wall such as surface 62 is the interior surface of a double panel wall, fire stop device 10 can be used because access to surface 62 is not necessary to firmly secure collar 12 against an outer surface of a wall.

As noted above, jacket 26 can be formed of steel or any other rigid or semi-rigid material that acts as a good heat conductor. Jacket 26, including tabs 28 and 30, end tabs 34 and 36, finger 42, feet 56 and slots 59 and 60 can be punched or otherwise formed from blanks of steel in the form shown in FIG. 4. In general, the jacket 26 can be fabricated by any known or conventional technique. Moreover, jacket 26 can be integrally made or may comprise multiple components connected together by conventional techniques. To form slot 40, parallel cuts can be made by any known means through jacket 26 adjacent to end 27, and the portion of jacket 26 interior to the cuts can be pushed out of the plane of the remainder of jacket 26. Slot 40 can also be formed in any other know manner such as by welding a strip of steel to jacket 26 adjacent to end 27 thereof. U-shaped cuts can be made in finger 42 and detent tabs 42a–42d can be formed as discussed above. Cuts for detent tabs 42a–42d and slot 40 can also be made when jacket 26 is punched or otherwise formed from the blanks. Slots 59 and 60 can be cut, punched or otherwise formed in tabs 30 and 28, respectively. Upper tabs 28, lower tabs 30, and end tabs 34 and 36 can be bent towards the radial interior of jacket 26 and feet 56 can be bent towards the radial exterior of jacket 26. It is also contemplated to form tabs containing slots 59 and 60 separately and weld or otherwise adhere the tabs to jacket 26. Layer 22 of intumescable material, or sub-layers thereof, can be placed at the radial interior of jacket 26 in the region between tabs 28 and 30, and end tabs 32 and 34.

Fastening device 14 is preferably formed from any plastically deformable, slightly flexible material and is preferably formed from stainless steel. It is also contemplated, however, to form portion 21, including radial shank portion 17 from an elastically deformable material, such as a resilient plastic, and attach portion 21 to an axial shaft portion 15 using conventional or otherwise known means. If the entirety of fastening device 14 is formed from stainless steel, fastening device 14, including elongated axial shaft portion 15 and portion 21, can be punched from a blank having the dimensions of fastening device 14. "U"-shaped cut 25 can be punched or otherwise formed in portion 21 when fastening device 14 is formed from the blank, or it can be cut in portion 21 using any known means after such formation. As discussed above, radial shank portion 17 is then bent out of the plane of the remainder of portion 21 as shown in FIG. 6.

Figure 7:
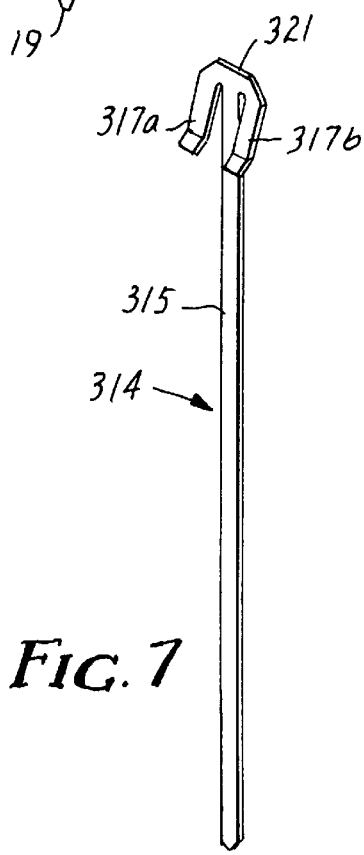
FIG. 7 is a perspective view of another embodiment of a fastening device which can be used to attach a collar of an intumescable fire stop device to a wall in accordance with the present invention.

It is to be understood that other fastening devices are within the ambit of the present invention. For example, FIG. 7 shows an alternate embodiment of a fastening device 314 similar to fastening device 14. However, rather than only a single radial shank portion 17, fastening device 314 includes two radial shank portions 317a and 317b extending from a portion 321 located at one end of an elongated axial shaft portion 315. Like fastening device 14, fastening device 314 is preferably formed from any plastically deformable, slightly flexible material and most preferably formed from stainless steel. As such, radial shank portions 317a and 317b can be bent out of the plane of portion 321. In this way, fastening device 314 can be used in same manner as fastening device 14 to firmly secure collar 12 against the surface of a wall or other structural member.

Another example of a fire stop device in accordance with the present invention is shown in FIG. 8. FIG. 8 is cross-sectional view of another embodiment of a fire stop device 110 including a collar 112 and a plurality of fastening devices 114. Like collar 12, collar 112 includes a layer 122 of intumescable material surrounded by a jacket 126. Layer 122 preferably comprises a plurality of sub-layers of intumescable material. Jacket 126 includes tabs 128 and tabs 130, end tabs (not shown), a connection device (not shown) and feet 156.

Figure 9:
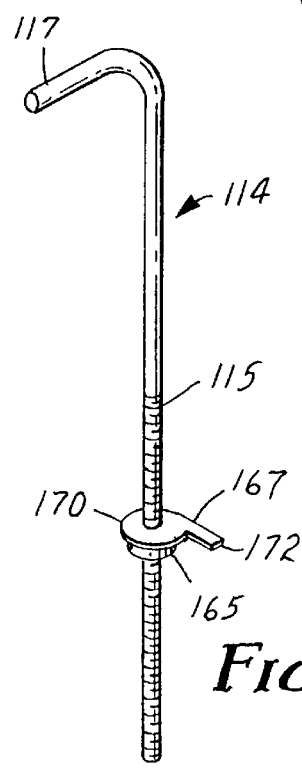
FIG. 9 is a perspective view of the fastening device shown in FIG. 8.

However, as is shown in FIG. 9, which is a perspective view of fastening device 114, rather than utilizing a flexible radial shank portion 17 like fastening device 14, fastening device 114 is a substantially rigid element. Fastening device 114 includes an elongated axial shaft portion 115 which is threaded to accommodate a locking nut 165 and a rotational stop 167. One end of fastening device 114 is bent at an angle, preferably a substantially 90 degree angle, to form a radial shank portion 117 extending from elongated axial shaft portion 115. It is also contemplated to bend the free end of radial shank portion 115 back in a direction parallel to axial shaft portion 115 so that fastening device 114 is bent substantially in the form of a "J".

Additionally, rather than elongate slots such as slots 59 and 60, jacket 126 includes guides defined by round apertures 159 located through tabs 130 and round apertures 160 located through tabs 128, which are axially aligned with tabs 130. It is also contemplated that tabs 128 and 130 be axially aligned and protrude radially outward from jacket 126 rather than radially inward as shown in FIG. 8. Round apertures 159 and 160 are sized to accommodate axial shaft portion 115.

To secure fire stop device 110 to a wall 152 having an element such as a pipe 150 passing through an opening 154 in wall 152, fastening devices 114 are placed through guides comprising the round apertures 159 and 160 in collar 112. Rotational stop 167 comprises a ring 170 having a protrusion 172 extending therefrom. A rotational stop 167 is inserted onto each axial shaft portion 115 axially above apertures 160. A locking nut 165 is then threaded onto each axial shaft portion 115 to retain rotational stop 167 thereon and fastening devices 114 in apertures 159 and 160. Collar 112 is placed around a pipe 150 adjacent to a wall 152. Fastening devices 114 are rotated in apertures 159 and 160 to a radially inward position so that radial shank portions 117 are positioned to lie closely against pipe 150. In this way, radial shank portions 117 of fastening devices 114 can be inserted through the portion 157 opening 154 between wall 152 and pipe 150. Fastening devices 114 can then be rotated to a radially outward position such that radial shanks 117 extend radially beyond the edge of opening 154 to engage surface 162 of wall 152 opposite to a surface 164 against which collar 112 is secured. A connecting device such as connecting device 38 can then be engaged so that collar 112 fits snugly around pipe 150 and locking nuts 165 can be tightened against upper tabs 128 to firmly secure collar 112 against wall 152. As locking nuts 165 are tightened, rotational stops 167 can be rotated so that protrusion 172 of rotational stop 167 lies against jacket 126. This reduces the likelihood that fastening devices 114 will rotate in apertures 159 and 160 to a position where radial shank portions 117 disengage with wall 152. It is also contemplated that each rotational stop 167 be located on a face of upper tabs 128 opposite to locking nut 165, or in a position against lower tabs 130.

Like fire stop device 10, fire stop device 110 can be used with walls of varying thickness. For a relatively thinner wall, locking nut 165 can be threaded relatively closer to radial shank portion 117 on axial shaft 115. For a relatively thick wall, locking nut 165 can be threaded relatively further from radial shank portion 117 on axial shaft portion 115. Further, installation of fire stop device 110 is advantageously relatively rapid and simple, and no drilling of holes adjacent to an opening through which a pipe extends is necessary. Also, installation can be completed without the need to access a wall, ceiling or floor surface opposite that on which fire stop device 110 is mounted so that installation can be completed by only a single installer.

Figure 11:
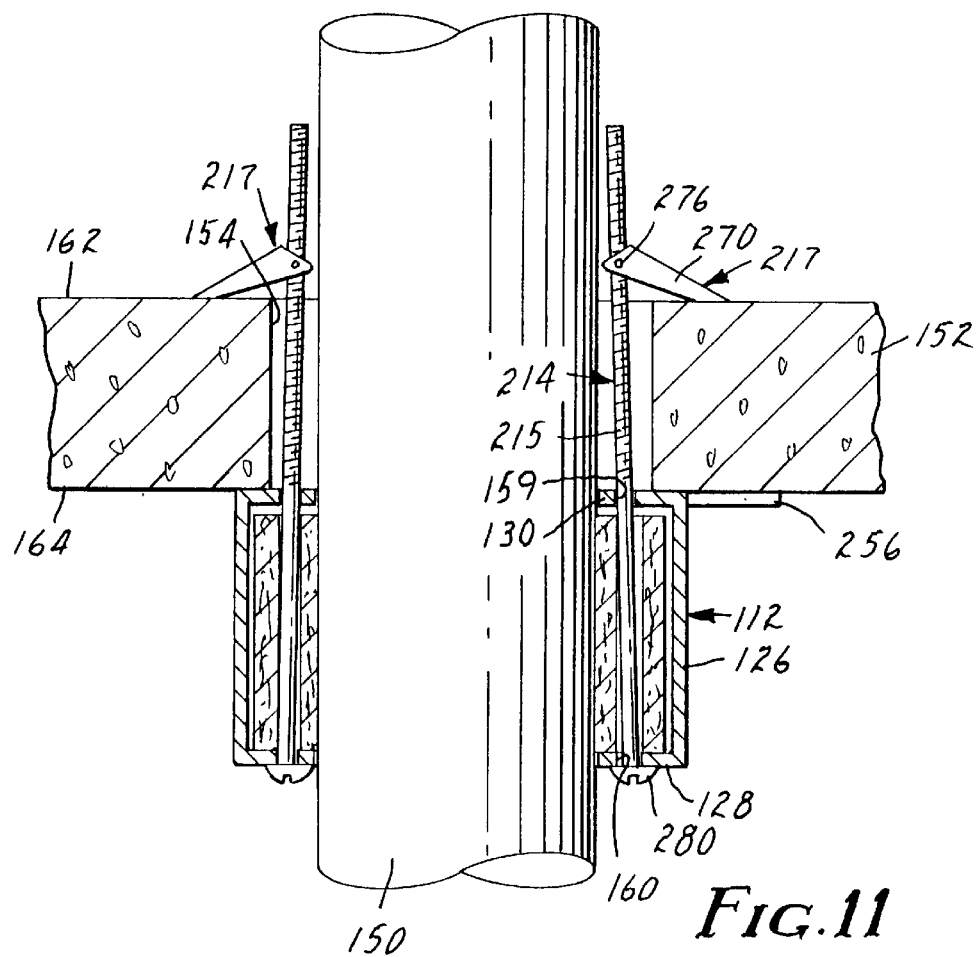
FIG. 11 is a cross-sectional view of a fire stop device including a plurality of fastening devices shown in FIG. 10 with the collar positioned around a pipe and secured to a wall.
Figure 10:
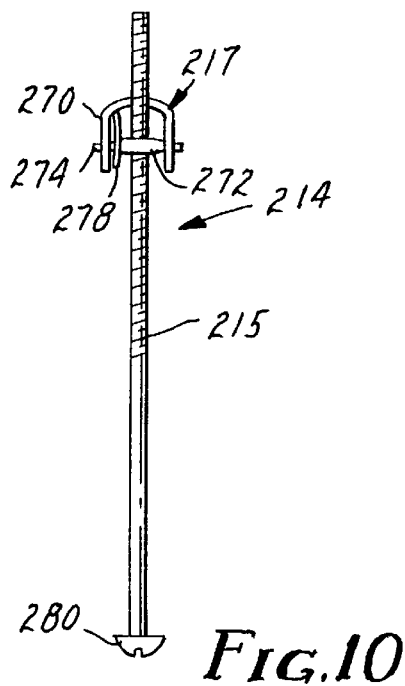
FIG. 10 is a rear view of another embodiment of a fastening device which can be used to attach a collar of an intumescable fire stop device to a wall in accordance with the present invention.

Another embodiment of a shank fastening device which can be used with collar 110 is shown in FIGS. 10 and 11, which are, respectively, a rear view of a fastening device 214 and a partially cut away view of collar 112 attached to wall 152 where a pipe 150 extends through a hole 154 in wall 152. Like fastening device 114, fastening device 214 includes an elongated axial shaft portion 215 which is generally cylindrical in shape. A slotted head 280 is preferably provided at one end of axial shaft portion 215. Fastening device 212 further includes a radial shank portion 217.

Radial shank portion 217 includes a rigid member 270 which preferably has a generally "U"-shaped cross-section. Member 270 is attached to axial shaft portion 215 via a threaded ring 272 that is positioned along the threads of axial shaft portion 215. A pair of bosses 274 protrude from either side of ring 272. The bosses 274 engage apertures 276 at the base of member 270 such that member 270 can pivot on bosses 274. Radial shank portion 217 is preferably spring loaded with a spring 278 coiled about one of the bosses and having a leg which tends to cause member 270 to protrude radially away from axial shaft portion 215.

As shown in FIG. 11, fastening device 214 can be used to secure collar 112 to a wall 152 in much the same way as fastening device 114, except that radial shank portion 217 of fastening device 214 does not need to be rotated against pipe 150 to be inserted into opening 154. Rather, because radial shank portion 217 is spring loaded, the axial shaft portion 215 of fastening device 214 can be placed through guides in collar 112 comprising apertures 159 and 160 in jacket 126 until slotted head 280 engages aperture 160, preventing fastening device 214 from passing through aperture 160. Radial shank portion 217 can be threaded onto the opposite end of axial shaft portion 215. Collar 112 can be placed around pipe 150 and against wall 152 by passing fastening device 214 through the portion of opening 154 between pipe 150 and wall 152. As radial shank portion 217 passes through opening 154, radial shank portion 217 can collapse against axial shaft portion 215 in a radial inward position, rotating on bosses 274, so that fastening device 214 fits through opening 154 between pipe 150 and wall 152. Once radial shank portion 217 has passed entirely though opening 154, spring 278 will force member 270 to protrude radially away from axial shaft portion 215, in a radially outward position, such that pulling fastening device 214 slightly axially away from wall 152 (that is, in a direction toward wall surface 164) will cause member 270 to engage surface 162 of wall 152. Slotted head 280 can then be rotated to engage slotted head 280 with aperture 160 and member 270 with surface 162 of wall 152, thereby firmly securing collar 112 against wall 152. Radial shank portion 217 can be formed from any suitably rigid material and is preferably formed of steel.

Collar 112 can be used with fastening device 214 on walls of differing thicknesses. For a relatively thicker wall, radial shank portion 217 can be threaded onto axial shaft portion 215 relatively closer to slotted head 280. For a relatively thinner wall, radial shank portion 217 can be threaded onto axial shaft portion 215 relatively further from slotted head 280. Installation of collar 112 using fastening device 214 is advantageously relatively rapid and simple, and no drilling of holes adjacent to an opening through which a pipe extends is necessary. Also, installation can be completed without the need to access a wall, ceiling or floor surface opposite that on which collar 112 is mounted so that installation can be completed by only a single installer.

Other configurations for fastening devices such as fastening device 14, 114, 214 and 314 are also within the armbit of the present invention. It is only necessary that a fastening device include a shaft, a shank and a means to attach it to a collar such as collar 12 or 112. The shank must be able to be inserted into an opening in a wall or other rigid surface through which a pipe or other member extends and between the wall and the pipe. The shank must then be extendible to engage the wall.

Though the present invention has been described with reference to preferred embodiments, those skilled in the art will recognize that changes can be made in form and detail without departing from the spirit and scope of the invention.

I claim:

1. An intumescable fire stop device for placement against a rigid first face a structural member and on an element extending through an opening in the structural member, comprising:

a collar for placement around an outer surface of the element and against the first face of the structural member, the collar including a semi-rigid jacket having at least one guide and supporting intumescable material;

at least one fastening device including;
an elongated axial shaft portion for passing through the opening in the structural member and adjustably attached to the collar along the guide; and
a radial shank portion supported by the elongated axial shaft portion and which is movable between a first radial inward position where it can be placed through the opening in the structural member and a second radial outward position where it can engage the structural member on a second face thereof opposite to the first face.

2. The intumescable fire stop device of claim 1 wherein the fastening device is formed from a sheet of flexible material.

3. The intumescable fire stop device of claim 2 wherein the radial shank portion includes an elastically deformable tab which is supported by the axial shaft portion and which elastically deforms towards the axial shaft portion when the radial shank portion is being placed through the opening in the rigid surface and returns to an essentially undeformed state after passing through the opening to engage the second face of the structural member.

4. The intumescable fire stop device of claim 3 wherein:
the guide includes at least one tab having a slot therethrough; and
the axial shaft portion includes a strip sized to fit through the at least one tab such that the fastening device attaches to the collar by passing the axial shaft portion through the slot and bending the axial shaft portion back along the collar.

5. The intumescable fire stop device of claim 1 wherein the fastening device includes a threaded, rigid cylinder.

6. The intumescable fire stop device of claim 5 wherein:
the radial shank portion of the fastening device is formed by bending a first end of the threaded rigid cylinder to extend at an angle to the remainder of the threaded rigid cylinder;
the axial shaft portion is formed from the remainder of the threaded rigid cylinder and can be attached to the collar such that the axial shaft portion can be rotated to cause the radial shank portion to lie against the element and the axial shank portion of the fastening device can be placed through the opening to allow the axial shaft portion to be rotated again after the radial shank portion has passed through the opening to engage the radial shank portion with the second face of the structural member; and the fastening device includes a rotational stop inserted onto the axial shaft portion and engageable with the jacket to prevent rotation of the axial shaft portion which would cause the radial shank portion to disengage with the second face of the structural member.

7. The intumescable fire stop device of claim 6 wherein:

the guide includes at least one tab having an aperture therein;

the fastening device includes a locking nut threadable onto the axial shaft portion of the fastening device; and the axial shaft portion of the fastening device is sized to fit through the aperture such that the fastening device is attached to the collar by placing the axial shaft portion through the aperture and threading the locking nut onto the axial shaft portion to retain the axial shaft portion in the aperture.

8. The intumescable fire stop device of claim 5 wherein:

the axial shaft portion of the fastening device includes the threaded, rigid cylinder; and the radial shank portion of the fastening device includes a spring-loaded member which is threaded onto the axial shaft portion such that placing the radial shank portion of the fastening device through the opening in the structural member causes the structural member to press against the spring-loaded member and fold the spring-loaded member against the axial shaft portion to allow the radial shank portion to pass through the opening, the spring-loaded member extending again after passing through the opening to engage the second face of the structural member.

9. The intumescable fire stop device of claim 8 wherein:

the guide includes at least one tab having an aperture therein; and the axial shaft portion of the fastening device is sized to fit through the aperture and includes a slotted head having a diameter greater than that of the aperture such that the fastening device is attached to the collar by placing the axial shaft portion through the aperature so that the axial shaft portion is retained in the aperture in the at least one tab by the slotted head.

10. A method for securing an intumescable fire stop device to a rigid surface of a structural member having an element passing through an opening in the structural member, the structural member including a first face opposite to a second face, comprising the steps of:

providing an intumescable fire stop device having a collar including a semi-rigid jacket having at least one guide and for supporting intumescable material, the collar further including at least one fastening device having an axial shaft portion connectable to the collar and a radial shank portion supported by the axial shaft portion which can radially protrude from the axial shaft portion;

inserting the axial shaft portion of the fastening device into the guide in the collar;

collapsing the radial shank portion of the fastening device into a first radial inward position;

inserting the radial shank portion of the fastening device into the opening and between the element and the structural member;

extending the radial shank portion to a second radial outward position to protrude beyond the second face of the structural member such that the fastening device resists passing back through the opening; and adjusting a position of the axial shaft portion in the guide such that the collar is firmly secured against the first face of the structural member.

11. The method of claim 10 wherein:

the step of providing an intumescable fire stop device includes providing a fastening device formed from a strip of flexible material and having a radial shank portion which includes an elastically deformable tab protruding therefrom;

the step of collapsing the radial shank portion of the fastening device into the opening includes inserting the radial shank portion into the opening and elastically deforming the tab towards the axial shaft portion between the element and an edge of the structural member; and the step of extending the radial shank portion includes returning the tab to an essentially undeformed state after it has passed through the opening such that the tab protrudes over the second face of the structural member.

12. The method of claim 11 wherein:

the step of inserting the axial shaft portion of the fastening device into the guide includes inserting the axial shaft portion through at least one slot formed in a tab attached to the collar; and the step adjusting the position of the axial shaft portion in the guide includes;

pulling the axial shaft portion through the slot until the collar is against the first face of the rigid surface; and bending the axial shaft portion about the collar.

13. The method of claim 10 wherein:

the step of providing an intumescable fire stop device includes providing a fastening device having a threaded, rigid shaft, one end of the threaded, rigid shaft being bent to form a radial shank portion which extends from the threaded, rigid shaft at an angle thereto;

the step of collapsing the radial shank portion of the fastening device into a first radial inward position includes rotating the threaded, rigid shaft so that the radial shank portion lies against the element to allow the radial shank portion to pass through the opening between the element and an edge of the rigid surface; and the step of extending the radial shank portion includes;

rotating the threaded, rigid shaft such that the radial shank portion will protrude away from the element and over the second face of the structural member; and engaging against the collar a rotational stop inserted on the threaded, rigid shaft, to prevent the radial shank portion from collapsing back against the element.

14. The method of claim 13 wherein:

the step of inserting the axial shaft portion into the guide includes:

placing the threaded, rigid shaft through at least one aperture formed in a tab attached to the collar; and threading a locking nut onto the threaded, rigid shaft to prevent the threaded, rigid shaft from passing out of the at least one aperture; and the step adjusting the position of the axial shaft portion in the guide includes rotating the locking nut on the threaded rigid shaft to move the locking nut towards the radial shank portion until the collar is firmly secured against the first face of the structural member.

15. The method of claim 10 wherein:

the step of providing a intumescable fire stop device includes providing a fastening device including a threaded rigid shaft having a slotted head affixed to one end thereof and a radial shank portion including a spring-loaded member threaded onto the threaded rigid shaft which protrudes away from the threaded rigid shaft in an undeflected position;

the step of collapsing the radial shank portion of the fastening device to a first radial inward position includes deflecting the spring-loaded member towards the threaded rigid shaft to allow the radial shank portion to pass through the opening between the member and the edge of the structural member; and the step of extending the radial shank portion of the fastening device includes allowing the spring-loaded member to return to the undeflected position such that the member extends over the second face of the structural member.

16. The method of claim 15 wherein:

the step of inserting the axial shaft portion of the fastening device into the guide includes placing the threaded, rigid shaft through at least one aperture formed in a tab attached to the collar such that the slotted head prevents the threaded rigid shaft from passing completely through the aperture; and the step adjusting the position of the axial shaft portion in the guide includes rotating the slotted head to move the spring-loaded member towards the slotted head on the threaded, rigid shaft until the collar is firmly secured against the first face of the structural member.

17. An intumescable fire stop device for placement against a rigid first face of a structural member and on an element extending through an opening in the structural member, comprising:

a collar for placement around an outer surface of the element and against the first face of the structural member, the collar including a semi-rigid jacket having at least one guide and supporting intumescable material;

at least one fastening device including;

an elongated axial shaft portion adjustably attached to the collar along the guide; and a radial shank portion supported by the elongated axial shaft portion and which is movable between a first radial inward position where it can be placed into the opening in the structural member and a second radial outward position where it can engage the structural member.

\* \* \* \* \*

UNITED STATES PATENT AND TRADEMARK OFFICE
CERTIFICATE OF CORRECTION

PATENT NO.: 5,887,396
DATED: March 30, 1999
INVENTOR(S): Thomas L. Thoreson

It is certified that error appears in the above-identified patent and that said Letters Patent is hereby corrected as shown below:

Col. 10, line 14, "first face a structural" should read --first face of a structural--.

Signed and Sealed this

Sixteenth Day of May, 2000

Attest:

Q. TODD DICKINSON

Attesting Officer        *Director of Patents and Trademarks*